United States Patent Office 3,042,501
Patented July 3, 1962

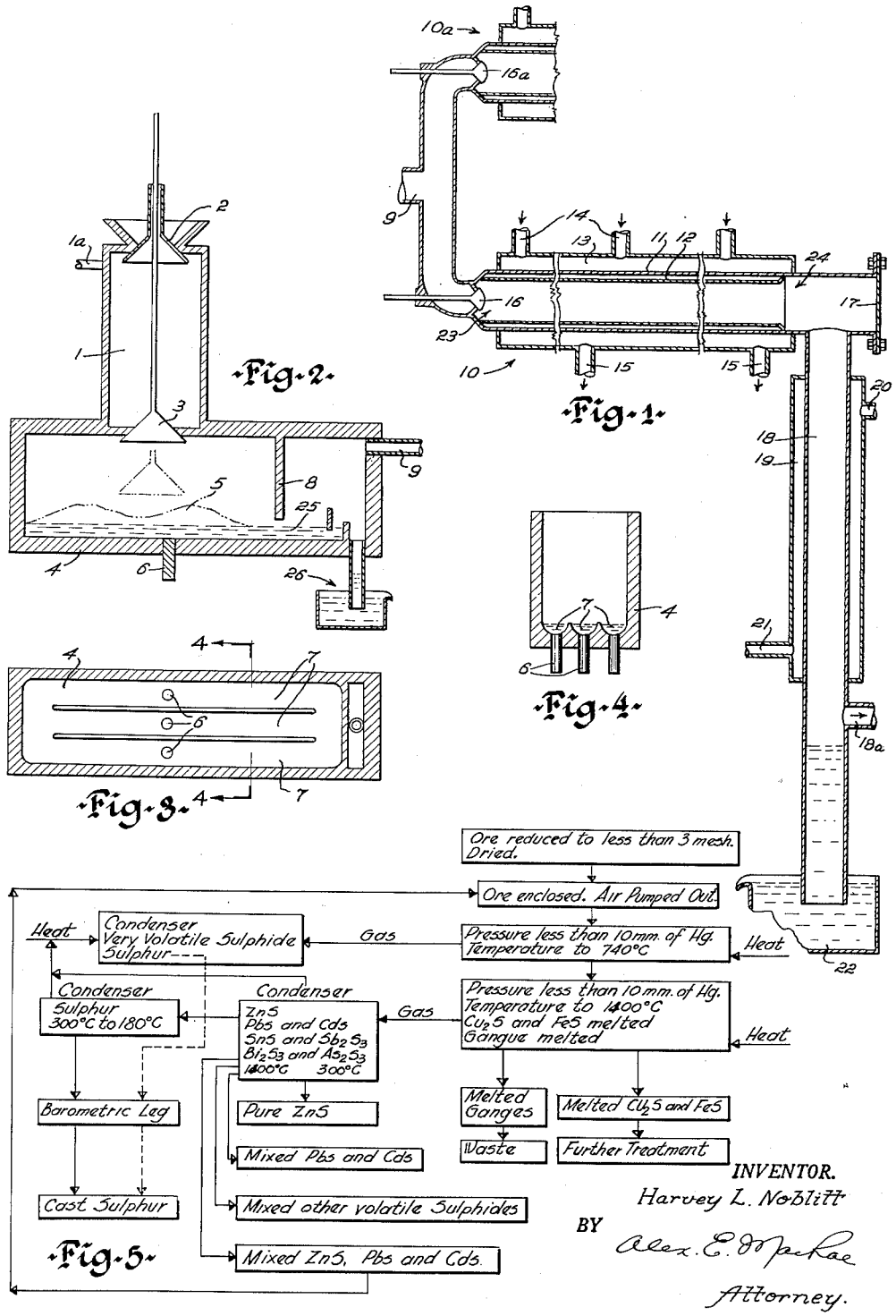

3,042,501
SEPARATION AND RECOVERY OF VOLATILE SULPHIDES FROM SULPHIDE MATERIALS
Harvey L. Noblitt, 143 1st Ave., Ottawa, Ontario, Canada
Filed Oct. 28, 1955, Ser. No. 543,466
1 Claim. (Cl. 23—294)

This invention relates to a method of separating the more volatile sulphides from ores, concentrates, mattes and the like containing the same and partial separation from one another.

In the present invention those sulphides which can be volatilized at temperatures up to 1400° C. in a vacuum containing a total pressure of from 1 to 10 mms. of mercury will be considered as the more volatile sulphides. The common sulphides in this group are those of zinc, cadmium, tin, mercury, antimony, arsenic, bismuth, indium and gallium. Common sulphides not included are those of iron, copper, cobalt, nickel, manganese, molybdenum and silver.

Sulphide ore deposits occur in many parts of the world and when the sulphide minerals are very fine and intimately mixed, the ore is said to be complex. These ores normally contain relatively small amounts of one or more of the sulphides of lead, zinc and copper with greater amounts of iron sulphides and usually a still greater amount of waste rock. Generally such ores contain at least minor amounts of some of the other volatile sulphides and may even contain some of the non-volatile sulphides.

Differential flotation is the method generally employed in an attempt to separate the valuable sulphides from the worthless sulphides, from the waste rock and from one another. Such flotation concentrates must meet certain specifications covering grade and impurities. That is, if the grade be too low or the percentage of impurities too high, the producer is penalized. Thus the producer attempts to provide a high grade concentrate to meet the specification standards and in so doing valuable products are often discharged in the tailings or waste; or the producer attempts to make several concentrates, each high in one particular sulphide, thus incurring further loss as well as increasing the treatment costs. The finer the sulphides and more complex the ore the more difficult it becomes to effect a satisfactory separation of the sulphides.

It is well known that substantially all sulphides can be recovered as a bulk concentrate with little loss by subjecting the sulphide ore to one flotation treatment. This invention is particularly adapted to treatment of such bulk concentrates in order to recover the individual volatile metal sulphides.

It is the object of the present invention to provide an efficient method of treating complex sulphide ores or bulk concentrates of sulphides by which substantially all the volatile sulphides can be separated from the non-volatile sulphides and from each other.

The present invention contemplates the provision of a method of recovering and separating volatile sulphides from sulphide containing material which comprises the successive steps of substantially completely drying the said material, deaerating the dried material, heating the deaerated material in a vacuum to vaporize the volatile sulphides, passing the volatilized sulphides to a condenser and cooling said condenser at a controlled rate to differentially condense the volatile sulphides therein.

The invention will be more particularly described with reference to the accompanying drawings in which:

FIGURE 1 is a cross-sectional view of a suitable form of condenser apparatus in accordance with the invention;

FIGURE 2 is a cross-sectional side view of a furnace and ore charging chamber;

FIGURE 3 is a cross-sectional plan view of the furnace;

FIGURE 4 is a vertical sectional view of FIGURE 3 taken on the lines 4—4; and

FIGURE 5 is a flow sheet of the method of the present invention.

The vapour pressure and temperature of a sulphide are directly related, i.e., the vapour pressure increases as its temperature is increased. For example, the temperature in degrees C at which the vapour pressure of the sulphide reaches 1, 2 and 10 millimeters of mercury respectively are approximately;

| Sulphide | 1 mm. | 2 mm. | 10 mm. |
| --- | --- | --- | --- |
| Arsenic | 415 | 430 | 470 |
| Antimony | 830 | 890 | 1,010 |
| Tin | 960 | 1,040 | 1,185 |
| Lead | 1,035 | 1,080 | 1,220 |
| Cadmium | 1,120 | 1,160 | 1,330 |
| Zinc | 1,240 | 1,290 | 1,420 |

This means that if the pressure is kept at 1 to 10 mms. of mercury the sulphides will boil or sublimate at these temperatures as heat is supplied and the temperatures will not rise above those figures until the particular sulphide is entirely volatilized.

In proceeding with the method of the present invention ore or matte is initially crushed to minus three mesh. The material to be treated which may include fine bulk concentrates, or the crushed ore or matte is substantially completely dried and is introduced into a charging chamber 1 having an upper or outer gas-tight gate 2 and a lower or inner gas-tight gate 3. The charging chamber 1 is connected to a hearth 4. With both gas-tight gates 2 and 3 closed the air is pumped out of the charging chamber 1 through the pipe 1a and when the desired vacuum pressure is reached, not exceeding 10 mms. of mercury, the inner gas-tight gate is opened permitting the dried deaerated feed to enter the hearth 4. The charge 5 is now heated, preferably by radiation as by means of electrodes 6 which extend into troughs 7 in the bottom of the furnace 4. The heating is continued until the first atom of sulphur is driven off any pyrite present and all the iron sulphide is reduced to FeS which reaction is usually complete at 740° C. The gases which are formed in the furnace, mostly sulphur gas and some of the more easily volatile sulphides such as those of arsenic, mercury, tin, bismuth and antimony, move past a depending baffle 8 and thence through a furnace outlet 9 to a condenser, generally designated as 10, where the metallic sulphides are condensed first and the sulphur last as the gases cool. The same pressure is maintained throughout the entire apparatus.

The residue still in solid condition which may be moved to a second hearth if desired is heated until the temperature is increased to between 1100° C. and 1400° C. As the temperature of the charge rises the volatile sulphides are volatilized, pass out of the furnace and are deposited in the forementioned condenser 10 or in another condenser where they solidify on cooling.

The condenser 10 comprises a horizontal tubular casing 11, a removable thin metal liner or sleeve 12 within the casing and spaced from the walls thereof. The liner 12 may be in sections and should be sealed against the condenser 10 at either end in order to prevent the sulphides condensing on the walls of the condenser. Surrounding the condenser and the sleeve is a cooling jacket 13 having inlets 14 and outlets 15 through which a cooling medium may be circulated. A valve 16 is provided at the end of furnace outlet 9 leading to the condenser. A removable closure member 17 is provided at the opposite end of the casing 11 to permit withdrawal of the liner 12. Extending vertically from the latter end of the casing is a tube 18 provided with a cooling jacket 19 having an inlet 20 and an outlet 21. The tube 18 extends into a container 22. A connection 18a leading to a vacuum pump may be provided in the tube 18.

If zinc sulphide is present in the gases it will condense first on the liner 12 and controlled cooling of the gases by means of the circulating medium through the jacket 13 will permit substantially all the zinc sulphide to condense in practically pure crystals. If gallium and indium sulphides are present they will deposit with the zinc sulphide. As the gases pass along the liner 12 to a cooler portion any lead sulphide and possibly any cadmium sulphide present will be similarly deposited. Since the vapour pressure of lead and cadmium sulphides are very similar over a considerable range of temperature they are deposited together and not normally separated by this process.

As the remaining gases pass along the liner the temperature decreases and tin sulphide, if present, will be deposited. At a still lower temperature any antimony sulphide present is deposited on the liner followed by bismuth and then arsenic sulphide. Sulphur gas is the last to condense. In this way the liner of the condenser becomes coated from the hot end 23 to the cool end 24 with successive rings of the various sulphide deposits. The relative purity of each ring depends on the rate of cooling as well as the vapour pressure differences of the sulphides present in the gas.

The temperature at the hot end 23 varies from 1100° C. to 1400° C. depending on the pressure and gradually decreases to approximately 250° C. at the cool end of the condenser. The rate of cooling of the condenser is approximately between 20 and 150° C. per foot of condenser length. The sulphur gas which condenses to a free flowing liquid at approximately 180° C. is condensed and collected in the tube 18 leading from the cool end 24 of the condenser. The liquid sulphur drains through the tube 18 into the container 22 thus forming the necessary barometric leg. The liquid sulphur from the container may be cast directly into any suitable form.

Minerals such as: tetrahedrite, $3Cu_2S.Sb_2S_3$; enargite, $3Cu_2S.As_2S_5$; pyrargyrite, $3Ag_2S.Sb_2S_3$; proustite, $$3Ag_2S.As_2S_3$$

teallite, $PbS.SnS$; stannite, $Cu_2S.FeS.SnS_2$; etc., in which the simple sulphides are combined in the mineral must be decomposed to the simple sulphides before they are volatilized. This may require an appreciably higher temperature than that required for volatilization of the simple sulphides. Since zinc sulphide does not form part of any of the above complex minerals and is the last to volatilize all the volatile sulphides will be expelled from the residue at a temperature about 1400° C. and a total pressure not exceeding 10 millimeters of mercury.

At the temperature of volatilization of the present invention all the volatile sulphides readily combine with oxygen to form their respective oxides and incondensable sulphur dioxide. Thus it is necessary that oxygen be removed from the interior of the system before heating begins. Metallic oxides do not volatilize at the aforementioned temperatures. The following examples more particularly illustrate the method contemplated by the present invention.

*Example 1*

A flotation concentrate containing 0.14% lead, 2.16% zinc, 42.20% iron, 0.36% copper, 43.50% sulphur, minor amounts of cadmium, tin, arsenic, bismuth and antimony, with traces of silver, gallium and indium, and the remainder inert rock material was dried and charged to a vacuum furnace. The doors of the furnace were secured and the air pumped out of it and the attached condenser until the total pressure was 2 mms. of mercury. Heat was applied and the temperature within the furnace raised to 740° C. at which temperature all of the sulphur from the decomposition of iron sulphides to FeS and $S_2$ gas was expelled. It was observed that some arsenic and antimony sulphides condensed at the hotter end of the condenser. The temperature was raised to 1230° C. and maintained for twenty minutes. The residue in the furnace was examined and consisted for the most part of solid FeS containing about 6% metallic iron from decomposition of FeS. A minor amount of the gangue material had been melted to a glassy slag. The condenser contained four prominent rings. The thicker ring at the hot end of the condenser consisted of colourless crystalline material which on analysis was shown to contain 99.9% zinc sulphide, less than 0.1% of cadmium sulphide, and less than 0.01% of each of indium, lead, gallium and silver sulphide. The second ring was much lighter and was composed of approximately 96.5% lead sulphide, 2.4% tin sulphide, 0.7% cadmium sulphide, and less than 0.2% bismuth sulphide, 0.05% zinc sulphide, 0.02% antimony sulphide and 0.01% arsenic sulphide. The third ring was orange coloured and consisted of antimony sulphide. The fourth ring consisted of arsenic sulphide and this was followed by condensed sulphur which collected at the cool end of the condenser. The analysis of the furnace residue was: no chemically detectable lead, 0.03% zinc, 0.54% copper, 58.00% iron, 31.35% sulphur, less than 0.01% silver and antimony with no spectroscopic traces of tin, bismuth, and arsenic, and the remainder slag. Recovery of lead, tin, arsenic and bismuth sulphides was substantially complete. Removal of the antimony sulphide was practically complete and removal of zinc sulphide was 99% complete. The final residue weighed 71.5% of the charge.

*Example 2*

A flotation concentrate from a complex ore which analyzed 0.35% lead, 5.05% zinc, 1.36% copper, 28.28% iron, 33.34% sulphur, 0.04% arsenic and the remainder inert rock material was subjected to the same treatment as described in Example 1. Four rings were obtained in the condenser, the first ring at the hot end of the condenser containing 99.9% zinc sulphide, the second ring containing 99% lead sulphide, a faint arsenic ring, and a sulphur ring. A pool of sulphur was collected at the cool end of the condenser. The recovery of lead and arsenic were complete while the zinc sulphide was 99.5% complete. The residue weighed 61.6% of the feed and contained 2.16% copper, no chemically detectable lead, 0.04% zinc, 49.92% iron, 29.40% sulphur, no arsenic and the remainder slag.

It will be apparent that between the ring deposits in the liner, areas of mixed sulphides may be formed. The amount of these mixed sulphides will depend on the controlled cooling of the gases in the condenser and also on the vapour pressure of the sulphides present at the temperature of deposition, e.g. of cadmium and lead. Such mixed sulphides may be returned to the feed for further treatment.

In practice it is preferable to have two condensers in parallel to recover the condensed sulphides, a second condenser being partially indicated at 10a to which a branch of the furnace outlet 9 leads through a control valve 16a. Thus while one condenser is receiving the sulphide gases the liner may be removed from the other condenser and be replaced by a fresh one. The loaded liner is removed in vacuum to a cooling and aerating chamber. Since the coefficient of expansion of the metal liner and the condensed sulphides are quite different the sulphides separate from the liner easily on cooling especially when aided by gentle tapping of the liner. The various sulphide rings may be further treated for the recovery of the metals by well known methods.

In the volatilization of the volatile sulphides heat may be provided to the furnace by any suitable method such as radiant energy from electrically heated resistance rods or it may be provided by resistance heating of a layer of non-volatile sulphides 25 on the furnace hearth 4.

Most sulphide ores or concentrates contain sufficient iron sulphide as pyrite to maintain this layer and usually enough to cause a steady overflow of melted non-volatile sulphides as slag or the like. In this instance the overflow may be utilized to form the necessary barometric leg 26, as shown in FIGURE 2.

The use of this method thus permits substantially complete recovery of the volatile sulphides from even the most complex sulphide ores, separates the volatile sulphides into relatively pure products and leaves the residue in a molten condition readily removable for further treatment.

The term "material" as employed in the claim is intended to mean a bulk concentrate, an ore, or a matte.

I claim:

The method of recovering sulphides of zinc, lead, tin, cadmium, mercury, arsenic, antimony, bismuth, indium and gallium, which comprises the steps of crushing a material containing a plurality of said sulphides, completely drying said crushed material, deaerating said dried material to create a vacuum not exceding 10 mms. of mercury surrounding said material, heating said deaerated material in said vacuum to a temperature in the range of 415–1420° C., maintaining the total vapor pressure in said vacuum not exceeding 10 mms. of mercury during the entire duration of said heating step to volatilize said sulphides, passing said volatilized sulphides into one end of a condenser, and cooling said condenser to differentially condense said volatilized sulphides during their passage therein.

References Cited in the file of this patent
UNITED STATES PATENTS

| | | |
|---|---|---|
| 875,381 | Rice | Dec. 31, 1907 |
| 996,474 | Fink | June 27, 1911 |
| 1,594,344 | Bakken | Aug. 3, 1926 |
| 1,941,610 | Macready | Jan. 2, 1934 |
| 1,955,964 | Kemmer | Apr. 24, 1934 |
| 2,103,131 | Wolf | Dec. 31, 1937 |
| 2,130,886 | Kemmer | Sept. 20, 1938 |
| 2,265,180 | Maier | Dec. 9, 1941 |